(12) United States Patent
Yang et al.

(10) Patent No.: US 11,975,349 B2
(45) Date of Patent: May 7, 2024

(54) CHEMICAL LIQUID RECEIVING ASSEMBLY AND APPARATUS FOR SUPPLYING CHEMICAL LIQUID

(71) Applicant: Semes Co., Ltd., Cheonan-si (KR)

(72) Inventors: Jinwoo Yang, Pyeongtaek-si (KR); Bongman Choi, Cheonan-si (KR); Dongyun Lee, Cheonan-si (KR)

(73) Assignee: Semes Co., Ltd., Cheonan-si (KR)

( * ) Notice: Subject to any disclaimer, the term of this patent is extended or adjusted under 35 U.S.C. 154(b) by 286 days.

(21) Appl. No.: 17/457,947

(22) Filed: Dec. 7, 2021

(65) Prior Publication Data
US 2022/0184653 A1    Jun. 16, 2022

(30) Foreign Application Priority Data

Dec. 15, 2020    (KR) .................. 10-2020-0175758

(51) Int. Cl.
*B05C 11/10*    (2006.01)
*B05B 9/03*    (2006.01)

(52) U.S. Cl.
CPC ............ *B05C 11/1007* (2013.01); *B05B 9/03* (2013.01)

(58) Field of Classification Search
None
See application file for complete search history.

(56) References Cited

U.S. PATENT DOCUMENTS

| | | | |
|---|---|---|---|
| 2004/0119776 A1* | 6/2004 | Nakamura | B41J 2/16508 347/30 |
| 2013/0000144 A1* | 1/2013 | Choi | H01L 21/67017 137/59 |
| 2014/0290093 A1* | 10/2014 | Jung | H01L 21/67034 34/570 |
| 2019/0057884 A1* | 2/2019 | Cho | H01L 21/02052 |
| 2020/0105546 A1* | 4/2020 | Kim | H01L 21/67023 |
| 2020/0361204 A1* | 11/2020 | Kim | B41J 11/46 |

(Continued)

FOREIGN PATENT DOCUMENTS

| | | |
|---|---|---|
| CN | 206014371 U | 3/2017 |
| KR | 10-2009-0073872 A | 7/2009 |

(Continued)

OTHER PUBLICATIONS

Chinese Office Action (English Translation Only) dated Feb. 8, 2024 for Chinese Application No. 202111479936.3; 8 Pages.

*Primary Examiner* — Paul R Durand
*Assistant Examiner* — Michael J. Melaragno
(74) *Attorney, Agent, or Firm* — DALY, CROWLEY, MOFFORD & DURKEE, LLP

(57) ABSTRACT

An apparatus for supplying chemical liquid may include a chemical liquid supply member for supplying a chemical liquid onto a substrate, a chemical liquid storing member for storing the chemical liquid, a chemical liquid receiving assembly for receiving the chemical liquid provided from the chemical liquid storing member and for providing the chemical liquid into the chemical liquid supply member, a first chemical liquid supply line for supplying the chemical liquid from the chemical liquid storing member to the chemical liquid receiving assembly, and a second chemical liquid supply line for supplying the chemical liquid from the chemical liquid receiving assembly to the chemical liquid supply member.

19 Claims, 5 Drawing Sheets

(56) References Cited

U.S. PATENT DOCUMENTS

| | | | | |
|---|---|---|---|---|
| 2020/0391505 A1* | 12/2020 | Park | ............... | B41J 2/16526 |
| 2020/0402818 A1* | 12/2020 | Lee | ............... | H01L 21/67309 |
| 2021/0001625 A1* | 1/2021 | Park | ............... | B41J 3/407 |
| 2021/0023836 A1* | 1/2021 | Kim | ............... | B41J 2/04581 |
| 2021/0197237 A1* | 7/2021 | Yun | ............... | B08B 3/02 |
| 2021/0335596 A1* | 10/2021 | Hong | ............... | H01L 21/02282 |
| 2022/0009249 A1* | 1/2022 | Ha | ............... | H01L 21/6838 |
| 2022/0105531 A1* | 4/2022 | Jung | ............... | B41J 2/19 |

FOREIGN PATENT DOCUMENTS

| | | |
|---|---|---|
| KR | 10-2011-0008105 A | 1/2011 |
| KR | 10-2019-0115339 A | 10/2019 |
| KR | 2019-0115339 A | 10/2019 |
| KR | 10-2020-0039565 A | 4/2020 |

* cited by examiner

CHEMICAL LIQUID RECEIVING ASSEMBLY AND APPARATUS FOR SUPPLYING CHEMICAL LIQUID

CROSS-REFERENCE TO RELATED APPLICATION

This application claims priority to Korean Patent Application No. 10-2020-0175758 filed on Dec. 15, 2020 in the Korean Intellectual Property Office (KIPO), the contents of which are herein incorporated by reference in its entirety.

BACKGROUND

1. Field

Example embodiments of the invention relate to a chemical liquid receiving assembly and an apparatus for supplying chemical liquid. More particularly, example embodiments of the invention relate to a chemical liquid receiving assembly capable of receiving a chemical liquid supplied onto a substrate, and an apparatus for supplying chemical liquid including such chemical liquid receiving assembly.

2. Related Technology

To manufacture a display device such as an organic light emitting display device, a process of supplying chemical liquid may be performed using a chemical liquid supply member like an ink jet head for providing a chemical liquid onto a substrate such that desired pixels may be formed on the substrate.

In general, the process of supplying chemical liquid may be executed using an apparatus for supplying chemical liquid including a chemical liquid storing member for storing the chemical liquid, a chemical liquid supply member for providing the chemical liquid, and a chemical liquid receiving member for receiving the chemical liquid supplied from the chemical liquid storing member and for providing the chemical liquid to the chemical liquid supply member.

In the process of supplying the chemical liquid onto a substrate, important process factors may usually include the treatment of bubbles included in the chemical liquid, the recovery of the chemical liquid and the recycle of the chemical liquid. However, the conventional apparatus for supplying chemical liquid may not effectively perform the treatment of bubbles included in the chemical liquid so that the failure of the process may be frequently occurred to reduce the reliability of the display device. Additionally, the conventional apparatus for supplying chemical liquid may not sufficiently execute the recovery of the chemical liquid and the recycle of the chemical liquid such that the cost for manufacturing the display device may be increased.

SUMMARY

It is one object of the invention to provide a chemical liquid receiving assembly capable of effectively removing bubbles included in chemical liquid.

It is another object of the invention to provide an apparatus for supplying chemical liquid capable of effectively removing bubbles included in chemical liquid and of efficiently recycling the chemical liquid.

According to an aspect of the invention, there is provided a chemical liquid receiving assembly including a receiving member, at least one inlet port, a flow guiding member and an outlet port. The receiving member may receive a chemical liquid. The at least one inlet port may be provided at an upper side of the receiving member and may be connected to a first chemical liquid supply line for supplying the chemical liquid into the receiving member. The flow guiding member may guide a flow of the chemical liquid introduced into the receiving member through the at least one inlet port such that the chemical liquid may flow along a side surface of the receiving member toward a lower portion of the receiving member. The outlet port may be provided at a bottom of the receiving member and may be connected to a second chemical liquid supply line to which the chemical liquid is provided from the receiving member.

In example embodiments, the flow guiding member may include an introducing space and an inclined member. The introducing space may temporarily receive the chemical liquid introduced into the receiving member through the inlet port, and may have a lower portion inclined toward the side surface of the receiving member. The lower portion of the introducing space may be fluid communicated with at least one chemical liquid flow path through which the chemical liquid flows along the side surface of the receiving member. The inclined member may be fluid communicated with the chemical liquid flow path and may be inclined toward the lower portion of the receiving member.

In some example embodiments, the chemical liquid receiving assembly may additionally include two chemical liquid flow paths. Here, the inclined member may have a width substantially the same as a width of the receiving member.

In example embodiments, the inclined member may have a sharp end toward the lower portion of the receiving member.

In example embodiments, a bottom face of the receiving member may be inclined downwardly from the inlet port toward the outlet port.

In example embodiments, the chemical liquid receiving assembly may additionally include at least one partitioning member for dividing an inside of the receiving member into at least two spaces. The least one partitioning member may have one end portion contacting a bottom face of the receiving member and the other end portion being separated from the bottom face of the receiving member.

In some example embodiments, the least one partitioning member may have a plurality of through holes.

In some example embodiments, the chemical liquid receiving assembly may additionally include a plurality of partitioning members. In this case, one partitioning member of the partitioning members may have one end portion being separated from the bottom face of the receiving member and the other end portion contacting the bottom face of the receiving member, another partitioning member of the partitioning members may have one end portion contacting the bottom face of the receiving member and the other end portion being separated from the bottom face of the receiving member, and still another partitioning member of the partitioning members may have one end portion being separated from the bottom face of the receiving member and the other end portion contacting the bottom face of the receiving member, whereby providing a chemical liquid path having a substantial zigzag shape in the receiving member.

In example embodiments, the partitioning member may have a sharp end.

According to another aspect of the invention, there is provided an apparatus for supplying chemical liquid including a chemical liquid supply member, a chemical liquid storing member, a chemical liquid receiving assembly, a first chemical liquid supply line and a second chemical liquid supply line. The chemical liquid supply member may supply a chemical liquid onto a substrate and the chemical liquid storing member may store the chemical liquid. The chemical liquid receiving assembly may receive the chemical liquid provided from the chemical liquid storing member and may provide the chemical liquid into the chemical liquid supply member. The first chemical liquid supply line may supply the chemical liquid from the chemical liquid storing member to the chemical liquid receiving assembly and the second chemical liquid supply line may supply the chemical liquid from the chemical liquid receiving assembly to the chemical liquid supply member. In this case, the chemical liquid receiving assembly may include a receiving member, at least one inlet port, a flow guiding member and an outlet port. The receiving member may receive a chemical liquid. The at least one inlet port may be provided at an upper side of the receiving member and may be connected to the first chemical liquid supply line. The flow guiding member may guide a flow of the chemical liquid introduced into the receiving member through the at least one inlet port such that the chemical liquid may flow along a side surface of the receiving member toward a lower portion of the receiving member. The outlet port may be provided at a bottom of the receiving member and may be connected to the second chemical liquid supply line.

In example embodiments, the flow guiding member may include an introducing space and an inclined member. The introducing space may temporarily receive the chemical liquid introduced into the receiving member through the at least one inlet port. The introducing space may have a lower portion inclined toward the side surface of the receiving member. The lower portion of the introducing space may be fluid communicated with at least one chemical liquid flow path through which the chemical liquid flows along the side surface of the receiving member. The inclined member may be fluid communicated with the chemical liquid flow path and may be inclined toward the lower portion of the receiving member.

In example embodiments, the chemical liquid receiving assembly may additionally include at least one partitioning member for dividing an inside of the receiving member into at least two spaces. The least one partitioning member may have one end portion contacting a bottom face of the receiving member and the other end portion being separated from the bottom face of the receiving member.

In some example embodiments, the chemical liquid receiving assembly may include a plurality of partitioning members. One partitioning member of the partitioning members may have one end portion being separated from the bottom face of the receiving member and the other end portion contacting the bottom face of the receiving member, another partitioning member of the partitioning members may have one end portion contacting the bottom face of the receiving member and the other end portion being separated from the bottom face of the receiving member, and still another partitioning member of the partitioning members may have one end portion being separated from the bottom face of the receiving member and the other end portion contacting the bottom face of the receiving member, whereby providing a chemical liquid path having a zigzag shape in the receiving member.

In some example embodiments, the apparatus for supplying chemical liquid may additionally include a collecting member for collecting a chemical liquid remained in the chemical liquid supply member and a recovery line for recycling the collected chemical liquid into the chemical liquid receiving assembly. The collected chemical liquid may be provided into the chemical liquid receiving assembly through the first chemical liquid supply line connected to the recovery line.

In other example embodiments, the apparatus for supplying chemical liquid may additionally include an auxiliary receiving member for temporarily receiving the chemical liquid between the chemical liquid receiving assembly and the chemical liquid supply member, and a pressure adjusting member for forming a positive pressure or a negative pressure in the auxiliary receiving member.

According to still another aspect of the invention, there is provided an apparatus for supplying chemical liquid including a chemical liquid supply member, a chemical liquid storing member, a chemical liquid receiving assembly, a plurality of first chemical liquid supply lines, a second chemical liquid supply line, a sensing member, and a control member. The chemical liquid supply member may supply a chemical liquid onto a substrate. The chemical liquid storing member may store the chemical liquid. The chemical liquid receiving assembly may receive the chemical liquid provided from the chemical liquid storing member and may provide the chemical liquid into the chemical liquid supply member. The plurality of first chemical liquid supply lines may supply the chemical liquid from the chemical liquid storing member to the chemical liquid receiving assembly. The second chemical liquid supply line may supply the chemical liquid from the chemical liquid receiving assembly to the chemical liquid supply member. The sensing member may sense an amount of the chemical liquid received in the chemical liquid receiving assembly. The control member may adjust the amount of the chemical liquid in the chemical liquid receiving assembly. The chemical liquid receiving assembly may include a receiving member for receiving a chemical liquid, at least one inlet port and an additional inlet port being provided at an upper side of the receiving member and being connected to the plurality first chemical liquid supply lines, respectively, a flow guiding member for guiding a flow of the chemical liquid introduced into the receiving member through the at least one inlet port to flow the chemical liquid along a side surface of the receiving member toward a lower portion of the receiving member, and an outlet port being provided at a bottom of the receiving member and being connected to a second chemical liquid supply line to which the chemical liquid is provided from the receiving member.

In example embodiments, the flow guiding member may include an introducing space and an inclined member. The introducing space may temporarily receive the chemical liquid introduced into the receiving member through the at least one inlet port and the additional inlet port. The introducing space may have a lower portion inclined toward the side surface of the receiving member. The lower portion of the introducing space may be fluid communicated with at least one chemical liquid flow path through which the chemical liquid flows along the side surface of the receiving member. The inclined member may be fluid communicated with the chemical liquid flow path and may be inclined toward the lower portion of the receiving member.

In example embodiments, the chemical liquid receiving assembly may include at least one partitioning member for dividing an inside of the receiving member into at least two spaces. The least one partitioning member may have one end portion contacting a bottom face of the receiving member and the other end portion being separated from the bottom face of the receiving member.

In some example embodiments, the apparatus for supplying chemical liquid may additionally include a collecting member for collecting a chemical liquid remained in the chemical liquid supply member and a recovery line for recycling the collected chemical liquid into the chemical liquid receiving assembly. The collected chemical liquid may be provided into the chemical liquid receiving assembly through one of the first chemical liquid supply lines connected to the recovery line.

In other example embodiments, the apparatus for supplying chemical liquid may additionally include an auxiliary receiving member for temporarily receiving the chemical liquid between the chemical liquid receiving assembly and the chemical liquid supply member, and a pressure adjusting member for forming a positive pressure or a negative pressure in the auxiliary receiving member.

According to example embodiments of the present invention, the bubbles included in the chemical liquid may be effectively removed by the chemical liquid receiving assembly having the above-described various configurations. Additionally, the chemical liquid remained in the chemical liquid supply member may be efficiently recycled by the collecting member and the recovery line. Further, the chemical liquid may be stably provided onto the substrate by the auxiliary receiving member and the pressure adjusting member. Moreover, the amount of the chemical liquid in the chemical liquid receiving assembly may be properly adjusted by the sensing member and the control member. The apparatus for supplying chemical liquid including such chemical liquid receiving assembly may be advantageously used in a process for manufacturing a display device including an organic light emitting display device while reducing cost for manufacturing the display device.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Figure 1:
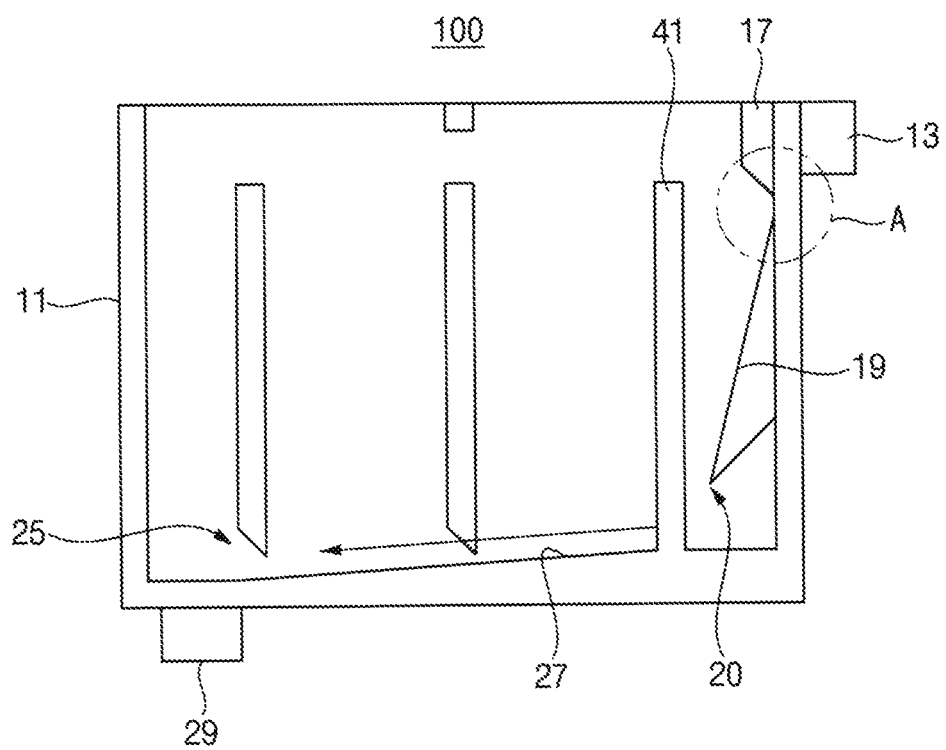
FIG. 1 is a schematic cross-sectional view illustrating a chemical liquid receiving assembly in accordance with example embodiments of the invention.

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. Like elements or components can be indicated by like reference numerals throughout the drawings, and the repeated explanations of like elements or components may be omitted.

FIG. 1 is a schematic cross-sectional view illustrating a chemical liquid receiving assembly in accordance with example embodiments of the invention.

Referring to FIG. 1, a chemical liquid receiving assembly 100 may be used to manufacture a display device including an organic light emitting display device. For example, the chemical liquid receiving assembly 100 may receive a chemical liquid from a chemical liquid storing member including a canister and may provide the chemical liquid to a chemical liquid supply member including an ink jet head capable of spraying the chemical liquid onto a substrate. In example embodiments, the chemical liquid receiving assembly 100 may include a receiving member 11, at least one inlet port 13, a flow guiding member and an outlet port 29.

The receiving member 11 may accommodate the chemical liquid provided from the chemical liquid storing member through the at least one inlet port 13. The receiving member 11 may define a receiving space therein in which the chemical liquid supplied onto the substrate may be accommodated.

The at least one inlet port 13 may be connected to a first chemical liquid supply line (not illustrated) for supplying the chemical liquid into the receiving member 11. The at least one inlet port 13 may be provided at one side of the receiving member 11. In the chemical liquid receiving assembly 100, the chemical liquid may flow toward a lower portion of the receiving member 11 along a side surface of the receiving member 11 such that the at least one inlet port 13 may be preferably installed at one upper side of the receiving member 11. However, the at least one inlet port 13 may have a position varied in accordance with a structure of the receiving member 11 and/or a structure of the chemical liquid receiving assembly 100.

The flow guiding member may guide a flow of the chemical liquid provided into the receiving member 11. For example, the flow guiding member may guide the flow of the chemical liquid introduced into the receiving member 11 through the at least one inlet port 13 such that the chemical liquid may flow toward the lower portion of the receiving member 11 along the side surface of the receiving member 11. The flow guiding member may be fluid communicated with the at least one inlet port 13. When the inlet port 13 is installed at the upper side of the receiving member 11, the flow guiding member may have a structure extending from an upper portion of the receiving member 11 to the lower portion of the receiving member 11. In example embodiments, the flow guiding member may include an introducing space 17 and an inclined member 19.

Hereinafter, it will be described the flow guiding member of the chemical liquid receiving assembly 100 in accordance with example embodiments.

Figure 2:
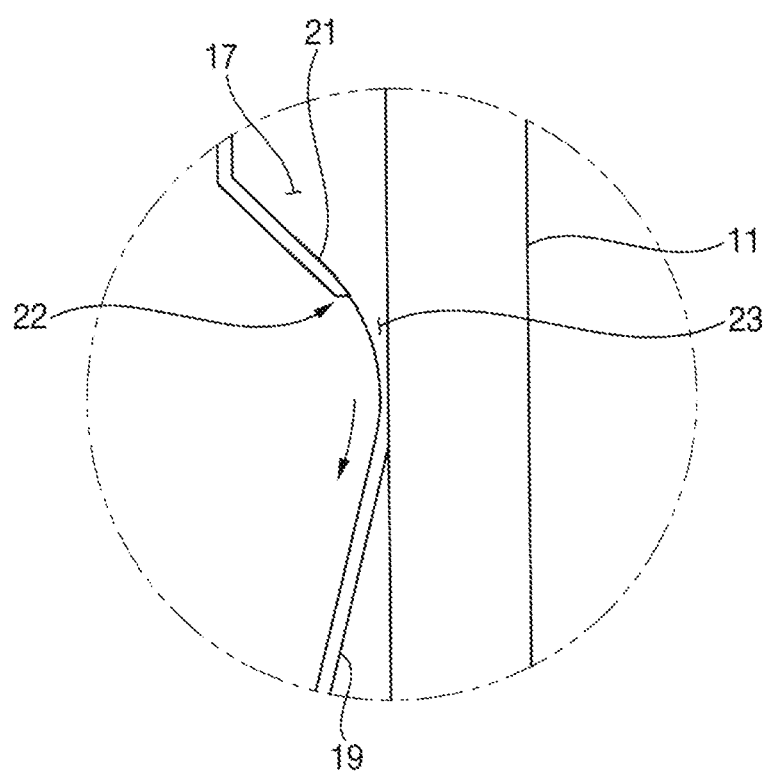
FIG. 2 is an enlarged cross-sectional view illustrating an "A" portion of FIG. 1.
Figure 3:
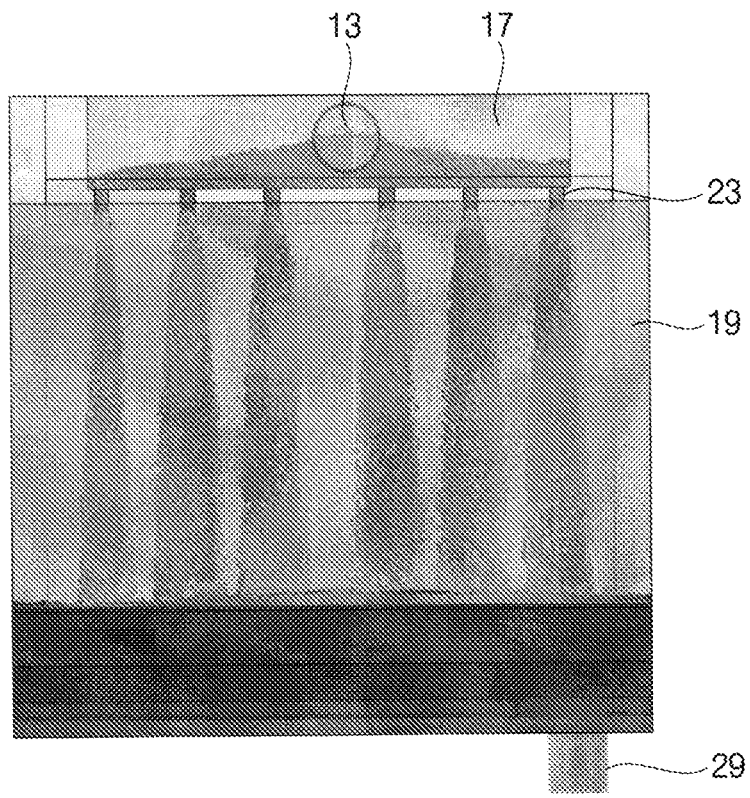
FIG. 3 is a schematic cross-sectional view illustrating a flow guiding member of the chemical liquid receiving assembly in accordance with example embodiments of the invention.

FIG. 2 is an enlarged cross-sectional view illustrating an "A" portion of FIG. 1. FIG. 3 is a schematic cross-sectional view illustrating the flow guiding member of the chemical liquid receiving assembly in accordance with example embodiments of the invention.

Referring to FIG. 1 to FIG. 3, the flow guiding member may include the introducing space 17 and the inclined member 19.

The introducing space 17 may temporarily accommodate the chemical liquid provided into the receiving member 11 through the inlet port 13. A lower portion 21 of the introducing space 17 may become narrow toward the side of the receiving member 11. At least one chemic liquid flow path 23 may be formed between the lower portion 21 of the introducing space 17 and the inclined member 19 so that the chemical liquid may flow downwardly along the side surface of the receiving member 11. In other words, the lower portion 21 of the introducing space 17 may be fluid communicated with the at least one chemical liquid flow path 23. In addition, the introducing space 17 may be fluid communicated with the least one inlet port 13. For example, the introducing space 17 may be provided at the upper portion of the receiving member 11.

The inclined member 19 may have a structure inclined from the side surface of the receiving member 11 toward the lower portion of the receiving member 11 by a predetermined angle such that the chemical liquid may pass through the chemical liquid flow path 23 and may flow downwardly along a surface of the inclined member 19. Therefore, the chemical liquid may flow from the introducing space 17 to the lower portion of the receiving member 11 along the chemical liquid flow path 23 and the inclined member 19.

According to example embodiments, the chemical liquid may be supplied into the introducing space 17 through the inlet port 13 and may be temporarily remained in the introducing space 17. The chemical liquid may flow along the side surface of the receiving member 11. Then, the chemical liquid may pass through the chemical liquid flow path 23 and may flow into the lower portion of the receiving member 11. When a chemical liquid including bubbles is supplied into the chemical liquid receiving assembly 100, a volume of the chemical liquid may be decreased while the chemical liquid flows along the side surface of the receiving member 11 and the surface of the inclined member 19. As the volume of the chemical liquid decreases, the bubbles included in the chemical liquid may be exposed to an air in the receiving member 11. Therefore, the bubbles may be removed from the chemical liquid by contacting the bubbles with the air.

In some example embodiments, a size of the chemical liquid flow path 23 connected to the introducing space 17 may be adjusted such that the bubbles included in the chemical liquid may not pass through the chemical liquid flow path 23. Therefore, the bubbles may be additionally removed form the chemical liquid. Additionally, the bubbles may be removed from the chemical liquid because of a friction between the chemical liquid and the surface of the inclined member 19 while the chemical liquid flows on the surface of the inclined member 19. Moreover, by adjusting the size of the chemical liquid flow path 23 and/or the angle of inclination of the inclined member 19, a time for the chemical liquid to flow on the surface of the inclined member 19 may be increased (that is, a velocity of flow of the chemical liquid may be decreased) such that the bubbles may be more effectively removed form the chemical liquid. Further, the bubbles may be removed from the chemical liquid since the bubbles may flow up to a surface of the chemical liquid while the chemical liquid temporarily remains in the receiving member 11.

In other example embodiments, the lower portion 21 of the introducing space 17 may have a sharp end 22 and thus may easily treat the bubbles included in the chemical liquid. Further, as illustrated in FIG. 1, the inclined member 19 may also have a sharp end 20 so that the bubbles included in the chemical liquid may be more easily treated.

As described above, the chemical liquid receiving assembly 100 may effectively remove or treat the bubbles included in the chemical liquid since the chemical liquid receiving assembly 100 may have the above various configurations for removing the bubbles from the chemical liquid.

In example embodiments, the chemical liquid receiving assembly 100 may include one inlet port 13 at the upper side of the receiving member 11. When the chemical liquid receiving assembly 100 includes the one inlet port 13, the one inlet port 13 may be provided at a center of the upper side of the receiving member 11. In some example embodiments, the chemical liquid receiving assembly 100 may include a plurality of inlet ports 13 at the upper side of the receiving member 11. If the chemical liquid receiving assembly 100 includes the plurality of inlet ports 13, the inlet ports 13 may be arranged at the upper side of the receiving member 11 by a substantially constant distance.

The introducing space 17 of the chemical liquid receiving assembly 100 may be provided in the receiving member 11 along a widthwise direction of the receiving member 11. In example embodiments, the chemical liquid receiving assembly 100 may include at least two chemical liquid flow paths 23 which may be defined by the introducing space 17 and the inclined member 19. The at least two chemical liquid flow paths 23 may be separated by a substantially constant distance. In this case, the inclined member 19 may be extended along the widthwise direction of the receiving member 11.

If the chemical liquid receiving assembly 100 has one chemical liquid flow path 23 only, the time for the chemical liquid flowing from the introducing space 17 to the lower portion of the receiving member 11 may be increased. Therefore, the chemical liquid receiving assembly 100 may include at least two chemical liquid flow paths 23 in the receiving member 11. If the inclined member 19 has a length smaller than the width of the receiving member 11, the chemical liquid may deviate from the inclined member 19 and may directly flow to the lower portion of the receiving member 11 so that the bubbles may not sufficiently removed from the chemical liquid. Accordingly, the inclined member 19 has the length substantially the same as the width of the receiving member 11.

Referring now to FIG. 1, the chemical liquid receiving assembly 100 may provide the chemical liquid into the chemical liquid supply member. The outlet port 29 may be connected to a second chemical liquid supply line connected to the chemical liquid supply member. For example, the outlet port 29 may be provided at a bottom of the receiving member 11. Here, the outlet port 29 may be opposed to the inlet port 13. Thus, the chemical liquid introduced through the inlet port 13 may pass through the receiving member 11, and then may flow to the second chemical liquid supply line through the outlet port 29.

If the flow of the chemical liquid is stagnant or the chemical liquid very slowly flows in the receiving member 11, undesired bubbles may be generated in the chemical liquid. To prevent the generation of the undesired bubbles in the chemical liquid, a bottom face of the receiving member 11 may be inclined downwardly from the inlet port 13 toward the outlet port 29 by a predetermined angle. In other words, the receiving member 11 may have a downwardly inclined bottom face 27 to the outlet port 29. Therefore, the chemical liquid may smoothly flow on the bottom face 27 of the receiving member 11 toward the outlet port 29 as indicated by an arrow without the generation of the bubbles.

In example embodiments, the chemical liquid receiving assembly 100 may include at least one partitioning member 41 in the receiving member 11. The at least one partitioning member 41 may prevent the stagnation of the chemical liquid or the slug flow of the chemical liquid in the receiving member 11 such that the chemical liquid may smoothly flow toward the outlet port 29.

Hereinafter, it will be described the partitioning members of the chemical liquid receiving assembly according to various example embodiments of the invention.

Figure 4:
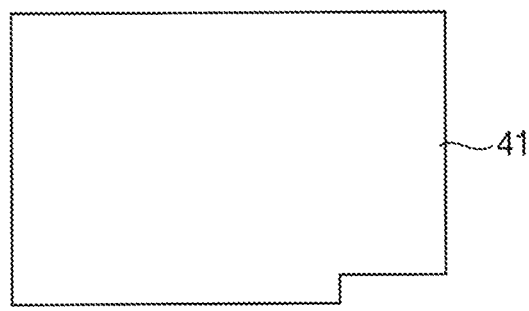
FIG. 4 is a schematic cross-sectional view illustrating a partitioning member of a chemical liquid receiving assembly in accordance with example embodiments of the invention.

FIG. 4 is a schematic cross-sectional view illustrating the partitioning member of the chemical liquid receiving assembly in accordance with example embodiments of the invention.

Referring to FIG. 1 and FIG. 4, the partitioning member 41 of the chemical liquid receiving assembly 100 may divide an inside of the receiving member 11 into at least two spaces. For example, the partitioning member 41 may have a plate shape. A bottom of the partitioning member 41 may be spaced apart from the bottom face of the receiving member 11 by a predetermined interval. Thus, the flow of the chemical liquid may not be substantially obstructed by the partitioning member 41.

In example embodiments, the at least two spaces may be provided in the receiving member 11 by the partitioning member 41 so that the bubbles included in the chemical liquid may be floated up to the surface of the chemical liquid and may be naturally removed in these spaces defined by the partitioning member 41. Therefore, the bubbles may be more effectively removed from the chemical liquid.

In some example embodiments, the partitioning member 41 may have one end portion contacting the bottom face 27 of the receiving member 11 and the other end portion being separated from the bottom face 27 of the receiving member 11. In other words, the partitioning member 41 may have an inclined bottom relative to the bottom face 27 of the receiving member 11. Accordingly, the bubbles may be more effectively removed form the chemical liquid while reducing the disturbance of the flow of the chemical liquid in the receiving member 11.

Figure 5:
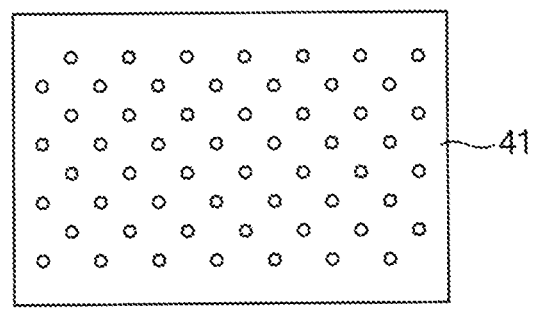
FIG. 5 is a cross-sectional view illustrating a partitioning member of a chemical liquid receiving assembly in accordance with some example embodiments of the invention.

FIG. 5 is a cross-sectional view illustrating a partitioning member of the chemical liquid receiving assembly in accordance with some example embodiments of the invention.

Referring to FIG. 5, the partitioning member 41 may have a porous structure such that the chemical liquid may pass through the partitioning member 41. That is, the partitioning member 41 may have a plurality of through holes formed therethrough. Therefore, the bubbles included in the chemical liquid may be more efficiently removed form the chemical liquid while minimizing the disturbance of the flow of the chemical liquid in the receiving member 11. Further, the bubbles may more efficiently removed from the chemical liquid as the chemical liquid passes through the plurality of through holes of the partitioning member 41.

In still another example embodiment, the partitioning member 41 may have the inclined bottom relative to the bottom face 27 of the receiving member 11 in addition to the plurality of through holes so as to not disturb the flow of the chemical liquid and to more efficiently remove the bubbles from the chemical liquid.

Figure 6:
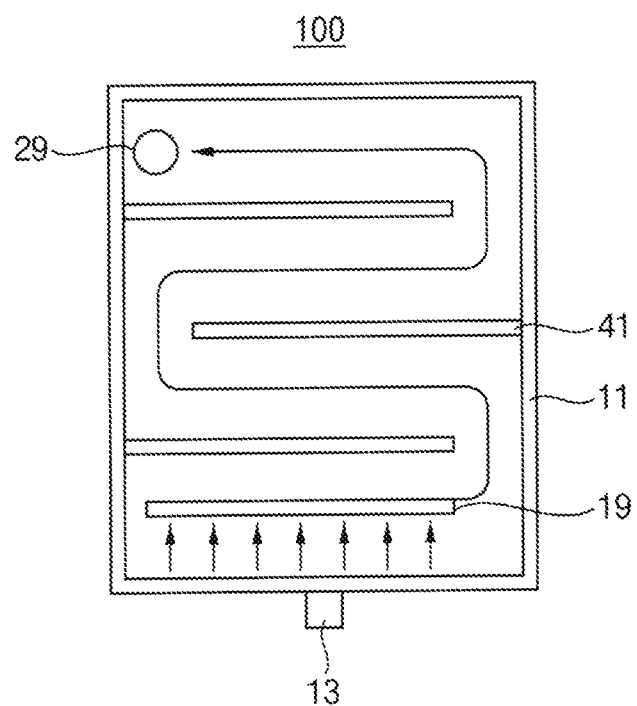
FIG. 6 is a schematic plane view illustrating a flow of a chemical liquid in a chemical liquid receiving assembly in accordance with other example embodiments of the invention.

FIG. 6 is a schematic plane view illustrating a flow of a chemical liquid in the chemical liquid receiving assembly in accordance with other example embodiments of the invention.

Referring to FIG. 6, the chemical liquid receiving assembly 100 may include a plurality of partitioning members 41. In this case, one partitioning member 41 may have one end portion separated from the bottom face 27 of the receiving member 11 and the other end portion contacting bottom face 27 of the receiving member 11. Another partitioning member 41 may have one end portion contacting the bottom face 27 of the receiving member 11 and the other end portion spaced apart form the bottom face 27 of the receiving member 11. Further, still another partitioning member 41 may have one end portion separated from the bottom face 27 of the receiving member 11 and the other end portion contacting bottom face 27 of the receiving member 11. Therefore, an extended chemical liquid path having a substantial zigzag shape may be provided in the receiving member 11 by the plurality of partitioning members 41. When the chemical liquid flows along the extended chemical liquid having the zigzag shape, the bubbles included in the chemical liquid may be much exposed to the air in the receiving member 11 such that the bubbles may be more efficiently removed from the chemical liquid.

Referring now to FIG. 1, the at least one partitioning member 41 may have sharp end 25 so that the bubbles in the chemical liquid may be removed from the chemical liquid when the at least one partitioning member 41 makes contact with the chemical liquid. In some example embodiments, when the chemical liquid receiving assembly 100 includes the plurality of partitioning members 41, the bubbles may be more efficiently removed from the chemical liquid by contacting the sharp ends 25 of the partitioning members 41 with the bubbles in the chemical liquid.

As described above, the chemical liquid receiving assembly 100 may have various configurations including the introducing space 17, the inclined member 19 and the at least one partitioning member 41 for effectively removing the bubbles from the chemical liquid. Accordingly, it may be prevented a failure that the chemical liquid is insufficiently provided from the chemical liquid supply member onto the substrate, or the chemical liquid is not supplied from the chemical liquid supply member onto the substrate.

If the chemical liquid flows over the at least one partitioning member 41, the bubbles may not be sufficiently removed from the chemical liquid. Therefore, an amount of the chemical liquid introduced through the at least one inlet port 13 may be controlled such that a surface of the chemical liquid may be lower than an upper face of the at least one partitioning member 41.

When the chemical liquid receiving assembly 100 includes an additional inlet port 85 disposed under the at least one inlet port 13 as described below with reference to FIG. 7, the amount of the chemical liquid may be controlled so that the surface of the chemical liquid may be lower than a height of the additional inlet port 85.

Hereinafter, it will be described an apparatus for supplying chemical liquid including a chemical liquid receiving assembly according to example embodiments.

Figure 7:
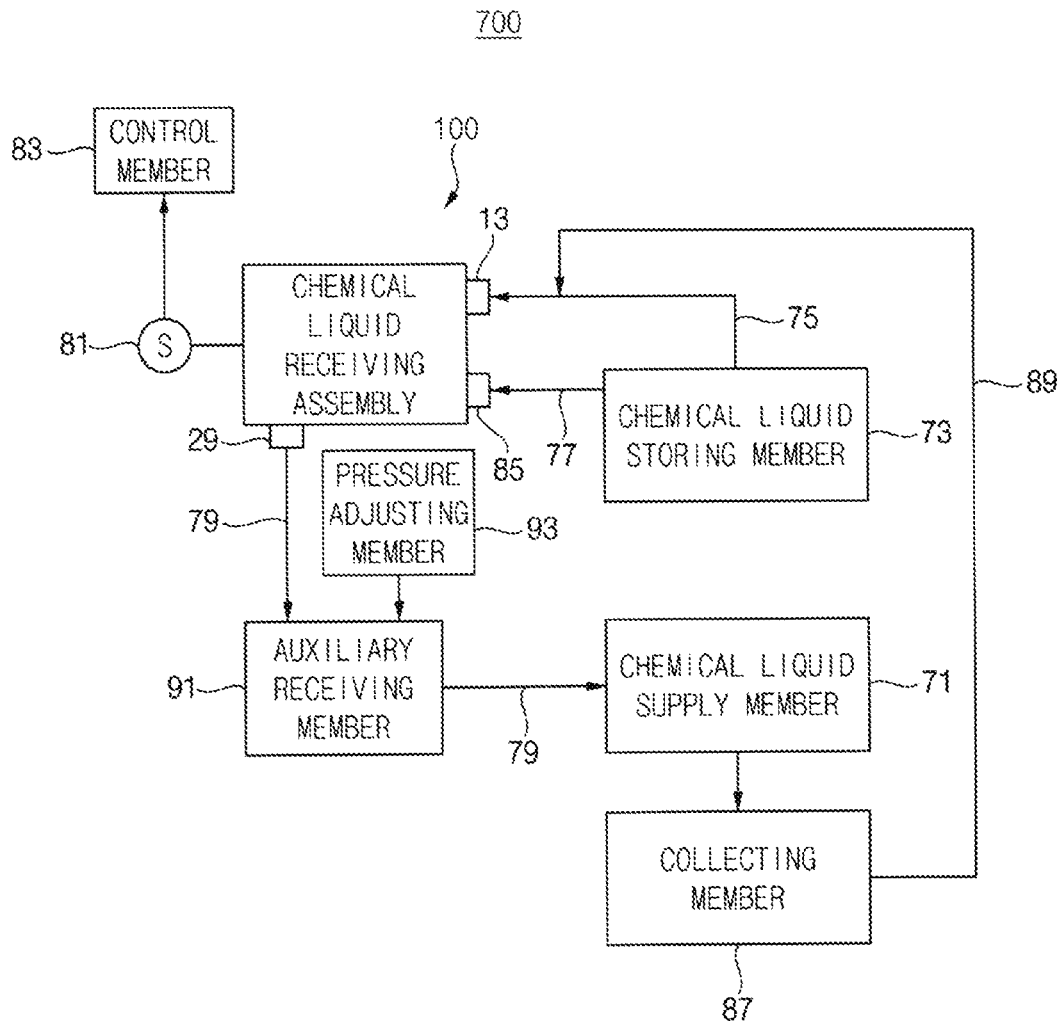
FIG. 7 is a block diagram illustrating an apparatus for supplying chemical liquid in accordance with example embodiments of the invention.

FIG. 7 is a block diagram illustrating an apparatus for supplying chemical liquid in accordance with example embodiments of the invention.

Referring to FIG. 7, an apparatus for supplying chemical liquid 700 may be utilized in a process of supplying a chemical liquid onto a substrate so as to form pixels on the substrate or a process of providing the chemical liquid onto the substrate in order to form a protective encapsulation layer on the substrate. In other words, the apparatus for supplying chemical liquid 700 may be used in various processes for manufacturing a display device including an organic light emitting display device.

In example embodiments, the apparatus for supplying chemical liquid 700 may include a chemical liquid supply member 71, a chemical liquid storing member 73, a chemical liquid receiving assembly 100, first chemical liquid supply lines 75 and 77, and a second chemical liquid supply line 79. Further, the apparatus for supplying chemical liquid 700 may include a sensing member 81, a control member 83, a collecting member 87, a recovery line 89, an auxiliary receiving member 91 and a pressure adjusting member 93.

The chemical liquid supply member 71 may provide the chemical liquid supplied from the chemical liquid receiving assembly 100 onto the substrate. For example, the chemical liquid supply member 71 may supply the chemical liquid onto the substrate transferred over a stage. Alternatively, the chemical liquid supply member 71 may provide the chemical liquid onto the substrate supported by a gantry.

In example embodiments, the chemical liquid supply member 71 may include an ink jet heat having a plurality of nozzles capable of spraying the chemical liquid onto the substrate. Further, the chemical liquid supply member 71 may additionally include a plurality of piezoelectric elements adjacent to the plurality of nozzles, respectively. In this case, predetermined voltages may be applied to the plurality of piezoelectric elements so as to operate the plurality of piezoelectric elements, respectively, and the chemical liquid may be sprayed onto the object from the plurality of nozzles by the operations of the plurality of piezoelectric elements.

The chemical liquid storing member 74 may include a canister capable of providing the chemical liquid into the chemical liquid receiving assembly 100. The chemical liquid receiving assembly 100 may include a buffer reservoir. Here, the chemical liquid receiving assembly 100 may have the various configurations described with reference to FIG. 1 to FIG. 6.

In other example embodiments, the chemical liquid receiving assembly 100 may include the additional inlet port 85 at the upper side of the receiving member 11 in addition to the at least one inlet port 13. The additional inlet port 85 may be disposed under the at least one inlet port 13. In this case, the at least one inlet port 13 may be connected to one of the first chemical liquid supply lines 75 and 77 and the additional inlet port 85 may be connected to the other of the first chemical liquid supply lines 75 and 77. Therefore, the chemical liquid may be provided into the chemical liquid receiving assembly 100 from the chemical liquid storing member 73 through the first chemical liquid supply lines 75 and 77 and the inlet ports 13 and 85.

The second chemical liquid supply line 79 may be connected to the outlet port 29 and the chemical liquid may be provided into the chemical liquid supply member 71 from the chemical liquid receiving assembly 100 through the outlet port 29 and the second chemical liquid supply line 79.

The sensing member 81 may measure an amount of the chemical liquid received in the receiving member 11. For example, the sensing member 81 may include a level sensor capable of sensing a height of the chemical liquid in the receiving member 11. The sensing member 81 may generate a sensing signal about the amount of the chemical liquid received in the receiving member 11.

The control member 83 may receive the sensing signal from the sensing member 81. The control member 83 may stop the supply of the chemical liquid into the receiving member 11 when the height of the chemical liquid is substantially equal to the upper face of the partitioning member 41. In addition, the control member 83 may begin the supply of the chemical liquid into the receiving member 11 when the height of the chemical liquid is substantially equal to a height of the additional inlet port 85. Therefore, the height of the chemical liquid in the receiving member 11 may be adjusted by the control member 83 such that the height of the chemical liquid may be maintained between the height of the additional inlet port 85 and the upper face of the partitioning member 41. That is, the control member 83 may suitably control the amount of the chemical liquid received in the receiving member 11.

In the process of supplying the chemical liquid onto the substrate using the apparatus for supplying chemical liquid 700, the chemical liquid may remain in the chemical liquid supply member 71 if all of the chemical liquid is not provided onto the substrate from the chemical liquid supply member 71. When the chemical liquid remains in the chemical liquid supply member 71, a failure of successive process of supplying the chemical liquid onto the substrate may be caused by the remained chemical liquid.

In example embodiments, the collecting member 87 may collect the remained chemical liquid from the chemical liquid supply member 71. The chemical liquid collected by the collecting member 87 from the chemical liquid supply member 71 may be recycled into the chemical liquid receiving assembly 100 through the recovery line 89 which may be connected to the first chemical liquid supply line 75 for connecting the chemical liquid storing member 73 to the chemical liquid receiving assembly 100. The collected chemical liquid may be provided into the receiving member 11 through the at least one inlet port 13.

In some example embodiments, the chemical liquid may be provided into the chemical liquid supply member 71 as a pressure of the chemical liquid may be adjusted to a positive pressure or a negative pressure. To this end, the apparatus for supplying chemical liquid 700 may include the auxiliary receiving member 91 and the pressure adjusting member 93. The auxiliary receiving member 91 may temporarily store the chemical liquid between the chemical liquid receiving assembly 100 and the chemical liquid supply member 71. The pressure adjusting member 93 may begin the supply of the chemical liquid from the auxiliary receiving member 91 to the chemical liquid supply member 71, or may stop the supply of the chemical liquid to the chemical liquid supply member 71. The pressure adjusting member 93 may for the positive pressure or the negative pressure in the auxiliary receiving member 91 such that a desired meniscus of the chemical liquid may be maintained in the chemical liquid supply member 71. Therefore, the chemical liquid may be more stably provided from the chemical liquid supply member 71 onto the substrate.

Hereinafter, it will be described a method of supplying a chemical liquid onto a substrate using the apparatus for supplying chemical liquid 700 according to example embodiments of the invention.

The chemical liquid may be supplied from an outer reservoir into the chemical liquid storing member 73 and may be provided into the chemical liquid receiving assembly 100 from the chemical liquid storing member 73 through the first chemical liquid supply lines 75 and 77 and the inlet ports 13 and 85. After bubbles included in the chemical liquid may be removed in the chemical liquid receiving assembly 100, the chemical liquid may be supplied into the auxiliary receiving member 91 through the outlet port 29 and the second chemical liquid supply line 91.

As the pressure in the auxiliary receiving member 91 may be adjusted by the pressure adjusting member 93, the chemical liquid may be provided into the chemical liquid supply member 71 from the auxiliary receiving member 91. Then, the chemical liquid may be provided onto the substrate from the chemical liquid supply member 71. In addition, the chemical liquid remaining in the chemical liquid supply member 71 may be collected by the collecting member 87, and then may be recycled into the chemical liquid receiving assembly 100 through the recovery line 89, the first chemical liquid supply line 75 and the inlet port 13.

According to example embodiments of the present invention, the bubbles included in the chemical liquid may be effectively removed by the chemical liquid receiving assembly having the above-described various configurations. Additionally, the chemical liquid remained in the chemical liquid supply member may be efficiently recycled by the collecting member and the recovery line. Further, the chemical liquid may be stably provided onto the substrate by the auxiliary receiving member and the pressure adjusting member. Moreover, the amount of the chemical liquid in the chemical liquid receiving assembly may be properly adjusted by the sensing member and the control member.

The apparatus for supplying chemical liquid including the chemical liquid receiving assembly may be advantageously used in a process for manufacturing a display device including an organic light emitting display device while reducing cost for manufacturing the display device.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A chemical liquid receiving assembly comprising:
   a receiving member for receiving a chemical liquid;
   at least one inlet port being provided at an upper side of the receiving member and being connected to a first chemical liquid supply line for supplying the chemical liquid into the receiving member;
   a flow guiding member for guiding a flow of the chemical liquid introduced into the receiving member through the at least one inlet port to flow the chemical liquid along a side surface of the receiving member toward a lower portion of the receiving member, wherein the flow guiding member comprises:
  an introducing space for temporarily receiving the chemical liquid introduced into the receiving member through the inlet port, the introducing space having a lower portion inclined toward the side surface of the receiving member, and the lower portion of the introducing space being fluid communicated with at least one chemical liquid flow path through which the chemical liquid flows along the side surface of the receiving member, and
  an inclined member being fluid communicated with the chemical liquid flow path and being inclined toward the lower portion of the receiving member; and
an outlet port being provided at a bottom of the receiving member and being connected to a second chemical liquid supply line to which the chemical liquid is provided from the receiving member.

2. The chemical liquid receiving assembly of claim 1, wherein the chemical liquid receiving assembly comprises two chemical liquid flow paths and the inclined member has a width same as a width of the receiving member.

3. The chemical liquid receiving assembly of claim 1, wherein the inclined member has a sharp end toward the lower portion of the receiving member.

4. The chemical liquid receiving assembly of claim 1, wherein a bottom face of the receiving member is inclined downwardly from the inlet port toward the outlet port.

5. The chemical liquid receiving assembly of claim 1, further comprising at least one partitioning member for dividing an inside of the receiving member into at least two spaces wherein the least one partitioning member has one end portion contacting a bottom face of the receiving member and the other end portion being separated from the bottom face of the receiving member.

6. The chemical liquid receiving assembly of claim 5, wherein the least one partitioning member has a plurality of through holes.

7. The chemical liquid receiving assembly of claim 5, wherein the chemical liquid receiving assembly comprises a plurality of partitioning members in which one partitioning member of the partitioning members has one end portion being separated from the bottom face of the receiving member and the other end portion contacting the bottom face of the receiving member, another partitioning member of the partitioning members has one end portion contacting the bottom face of the receiving member and the other end portion being separated from the bottom face of the receiving member, and still another partitioning member of the partitioning members has one end portion being separated from the bottom face of the receiving member and the other end portion contacting the bottom face of the receiving member, whereby providing a chemical liquid path having a zigzag shape in the receiving member.

8. The chemical liquid receiving assembly of claim 5, wherein the partitioning member has a sharp end.

9. An apparatus for supplying chemical liquid comprising:
  a chemical liquid supply member for supplying a chemical liquid onto a substrate;
  a chemical liquid storing member for storing the chemical liquid;
  a chemical liquid receiving assembly for receiving the chemical liquid provided from the chemical liquid storing member and for providing the chemical liquid into the chemical liquid supply member;
  a first chemical liquid supply line for supplying the chemical liquid from the chemical liquid storing member to the chemical liquid receiving assembly; and
  a second chemical liquid supply line for supplying the chemical liquid from the chemical liquid receiving assembly to the chemical liquid supply member,
  wherein the chemical liquid receiving assembly comprises:
    a receiving member for receiving a chemical liquid;
    at least one inlet port being provided at an upper side of the receiving member and being connected to the first chemical liquid supply line;
    a flow guiding member for guiding a flow of the chemical liquid introduced into the receiving member through the at least one inlet port to flow the chemical liquid along a side surface of the receiving member toward a lower portion of the receiving member; and
    an outlet port being provided at a bottom of the receiving member and being connected to a second chemical liquid supply line to which the chemical liquid is provided from the receiving member.

10. The apparatus for supplying chemical liquid of claim 9, wherein the flow guiding member comprises:
  an introducing space for temporarily receiving the chemical liquid introduced into the receiving member through the at least one inlet port, the introducing space having a lower portion inclined toward the side surface of the receiving member, and the lower portion of the introducing space being fluid communicated with at least one chemical liquid flow path through which the chemical liquid flows along the side surface of the receiving member; and
  an inclined member being fluid communicated with the chemical liquid flow path and being inclined toward the lower portion of the receiving member.

11. The apparatus for supplying chemical liquid of claim 9, wherein the chemical liquid receiving assembly further comprises at least one partitioning member for dividing an inside of the receiving member into at least two spaces, and wherein the least one partitioning member has one end portion contacting a bottom face of the receiving member and the other end portion being separated from the bottom face of the receiving member.

12. The apparatus for supplying chemical liquid of claim 11, wherein the chemical liquid receiving assembly comprises a plurality of partitioning members in which one partitioning member of the partitioning members has one end portion being separated from the bottom face of the receiving member and the other end portion contacting the bottom face of the receiving member, another partitioning member of the partitioning members has one end portion contacting the bottom face of the receiving member and the other end portion being separated from the bottom face of the receiving member, and still another partitioning member of the partitioning members has one end portion being separated from the bottom face of the receiving member and the other end portion contacting the bottom face of the receiving member, whereby providing a chemical liquid path having a zigzag shape in the receiving member.

13. The apparatus for supplying chemical liquid of claim 9, further comprising
  a collecting member for collecting a chemical liquid remained in the chemical liquid supply member; and
  a recovery line for recycling the collected chemical liquid into the chemical liquid receiving assembly, wherein the collected chemical liquid is provided into the chemical liquid receiving assembly through the first chemical liquid supply line connected to the recovery line.

14. The apparatus for supplying chemical liquid of claim 9, further comprising:
    an auxiliary receiving member for temporarily receiving the chemical liquid between the chemical liquid receiving assembly and the chemical liquid supply member; and
    a pressure adjusting member for forming a positive pressure or a negative pressure in the auxiliary receiving member.

15. An apparatus for supplying chemical liquid comprising:
    a chemical liquid supply member for supplying a chemical liquid onto a substrate;
    a chemical liquid storing member for storing the chemical liquid;
    a chemical liquid receiving assembly for receiving the chemical liquid provided from the chemical liquid storing member and for providing the chemical liquid into the chemical liquid supply member;
    a plurality of first chemical liquid supply lines for supplying the chemical liquid from the chemical liquid storing member to the chemical liquid receiving assembly; and
    a second chemical liquid supply line for supplying the chemical liquid from the chemical liquid receiving assembly to the chemical liquid supply member, a sensing member for sensing an amount of the chemical liquid received in the chemical liquid receiving assembly; and
    a control member for adjusting the amount of the chemical liquid in the chemical liquid receiving assembly,
    wherein the chemical liquid receiving assembly comprises:
        a receiving member for receiving a chemical liquid;
        at least one inlet port and an additional inlet port being provided at an upper side of the receiving member and being connected to the plurality first chemical liquid supply lines, respectively;
        a flow guiding member for guiding a flow of the chemical liquid introduced into the receiving member through the at least one inlet port to flow the chemical liquid along a side surface of the receiving member toward a lower portion of the receiving member; and
        an outlet port being provided at a bottom of the receiving member and being connected to a second chemical liquid supply line to which the chemical liquid is provided from the receiving member.

16. The apparatus for supplying chemical liquid of claim 15, wherein the flow guiding member comprises:
    an introducing space for temporarily receiving the chemical liquid introduced into the receiving member through the at least one inlet port and the additional inlet port, the introducing space having a lower portion inclined toward the side surface of the receiving member, and the lower portion of the introducing space being fluid communicated with at least one chemical liquid flow path through which the chemical liquid flows along the side surface of the receiving member; and
    an inclined member being fluid communicated with the chemical liquid flow path and being inclined toward the lower portion of the receiving member.

17. The apparatus for supplying chemical liquid of claim 15, wherein the chemical liquid receiving assembly further comprises at least one partitioning member for dividing an inside of the receiving member into at least two spaces, and wherein the least one partitioning member has one end portion contacting a bottom face of the receiving member and the other end portion being separated from the bottom face of the receiving member.

18. The apparatus for supplying chemical liquid of claim 15, further comprising:
    a collecting member for collecting a chemical liquid remained in the chemical liquid supply member; and
    a recovery line for recycling the collected chemical liquid into the chemical liquid receiving assembly,
    wherein the collected chemical liquid is provided into the chemical liquid receiving assembly through one of the first chemical liquid supply lines connected to the recovery line.

19. The apparatus for supplying chemical liquid of claim 15, further comprising:
    an auxiliary receiving member for temporarily receiving the chemical liquid between the chemical liquid receiving assembly and the chemical liquid supply member; and
    a pressure adjusting member for forming a positive pressure or a negative pressure in the auxiliary receiving member.

* * * * *